United States Patent [19]

Cherubim et al.

[11] 4,076,683
[45] Feb. 28, 1978

[54] MOLDING COMPOSITIONS OR MASSES SUITABLE FOR MANUFACTURING FOUNDRY MOLDS AND CORES USING THE COLD BOX METHOD

[75] Inventors: Martin Cherubim, Rheinkamp; Karl-Heinz Heinemann, Neukirchen-Vluyn; Friedrich Josten, Rheinkamp, all of Germany

[73] Assignee: Deutsche Texaco Aktiengesellschaft, Hamburg, Germany

[21] Appl. No.: 605,111

[22] Filed: Aug. 15, 1975

[51] Int. Cl.$^2$ .................. C08K 3/36; C08G 6/02; C08G 18/28
[52] U.S. Cl. .................. 260/37 N; 260/64; 260/DIG. 40
[58] Field of Search .............. 260/DIG. 40, 64, 37 N

[56] References Cited

U.S. PATENT DOCUMENTS

| | | | |
|---|---|---|---|
| 2,674,591 | 4/1954 | White et al. | 260/64 |
| 2,711,971 | 6/1955 | Miller et al. | 260/64 X |
| 3,428,110 | 2/1969 | Walker et al. | 260/DIG. 40 |
| 3,676,392 | 7/1972 | Robins | 260/DIG. 40 |
| 3,806,491 | 4/1974 | Gardikes et al. | 260/DIG. 40 |

FOREIGN PATENT DOCUMENTS

2,039,330   2/1972   Germany.

*Primary Examiner*—Sandra M. Person
*Attorney, Agent, or Firm*—Thomas H. Whaley; Carl G. Ries; Bernard Marlowe

[57] ABSTRACT

Molding compositions or masses comprising sand and a two-component binder system are prepared. These two-component binders consist essentially of 1) polyisocyanate and 2) a low molecular weight polymethylol produced by the controlled condensation of narrow mole ratios of acetone and formaldehyde under alkaline reaction conditions followed by acidification and removal of sufficient water to produce a minimum solid content of at least 95%. These molding compositions cure so fast that they may be taken off the mold five minutes after having been cured with an amine curing agent, and reach a substantial bending strength within minutes of curing compared to prior art compositions which achieve comparable bending strength only after a period of as long as one hour.

4 Claims, No Drawings

MOLDING COMPOSITIONS OR MASSES SUITABLE FOR MANUFACTURING FOUNDRY MOLDS AND CORES USING THE COLD BOX METHOD

SUMMARY OF THE INVENTION

Most broadly, this invention relates to a 2-component binder system, one component of which is polyisocyanate, the other component an acetone-formaldehyde condensation product having a low molecular weight prepared by condensing a critical mole ratio of acetone and formaldehyde, in a practically or near neutral reaction, acidification at a specified pH range and decantation of sufficient water to produce a substantially solid resin product.

Specifically, this invention relates to a two-component binder system prepared as follows:

One component of the binder system is 1) a polyisocyanate, low molecular weight polymethylol produced by conducting the condensation of acetone and formaldehyde in a critical mole ratio of 1.0 acetone: 1.0 to 2.5 formaldehyde in the presence of 0.005 to 0.015 of alkali to produce a practically neutral reaction mixture, then acidifying up to a pH value of 4, removing the water produced so that the mixture contains a solids content of at least 95%. The condensate produced under these critical conditions contains active hydrogens and is not really a resin but rather a low molecular weight polymethylol ranging in molecular weight preferably from about 140 to 220.

BACKGROUND OF THE INVENTION

There is no shortage of core-making and mold manufacturing methods available to the foundryman for his uses. Hot-box processes are advantageous in some respects in that they provide high production, high strength, and dimensional accuracy. However, hot-box procedures have high tooling costs as well as relatively poor surface finishes.

The cold box process, one of the alternatives to the hot-box or shell processes, is useful because it provides good surfaces, a high degree of collapsibility, and rapid cures possessing good tensile strength and good abrasion resistance. In both types of processes (hot box or cold box) a major amount of sand and a minor amount of binder are employed.

PRIOR ART

Molding compensations or masses comprisng a major amount of sand and a minor amount of a two-component binder system for use in the cold box are known. One component of the binder system usually is a resin having active hydrogen atoms, and the other is a polyisocyanate. German Auslegeschrift No. 2 039 330 describes a molding composition in which the resin, having active hydrogen atoms, is a hydroxyl group containing ketone-formaldehyde resin condensate. This resin has several advantages over other active hydrogen containing resins used in the cold box method. There is no environmental pollution problem as occurs with phenolic resins; the ketone-formaldehyde resins are more economical than the furan resins; and, unlike the amine resins, the ketone formaldehyde resins do not lead to pin hole formations. Moreover, the molding masses containing ketonic resin-polyisocyanate binder systems have the significant advantage of longer storage life. In fact, the storage life is longer than that of all other known compositions formulated for use in the cold box method. However, even though these binding systems can be cured very rapidly with gaseous amines such as triethyl amine, the molding masses containing ketonic-resin polyisocyanate binder systems such as described in German Auslegeschrift No. 2 039 330 suffer from the disadvantage of poor bending strength even after nearly one hour in the cold box. What is desired in a resin binder system that retains the advantages of the binder system of Auslegeschrift No. 2 039 330 and overcomes the aforementioned disadvantages of the above designated patent.

Another disclosure of pertinence is to be found in German Auslegeschrift No. 2 256 285. This patent also describes ketone (acetone) formaldehyde condensations of low molecular weight referred to as precondensates. However, as described subsequently in our invention, their products have a mole ratio of 1.0 mole acetone to 2.5 to 6.0 moles of formaldehyde. The reaction mixture in their disclosure is not acidified subsequent to the condensation reaction (as we do) but the water is decanted in vacuo immediately after the condensation reaction takes place until the desired solids content is obtained. In addition, the precondensates are not cured (as ours are) with a polyisocyanate but are cured instead with an acid catalyst. Moreover, a reactive solvent such as furfuryl alcohol is employed.

It is the object of this invention to provide molding masses comprising all the aforementioned advantages of a ketone polyisocyanate binder system of the prior art and in addition having a greater bending strength immediately after being cured with the catalyst.

In order to further aid in the understanding and scope of this invention, the following additional disclosure is submitted. Unless specified otherwise, all temperatures are in degrees centigrade and parts are by weight rather than volume.

A. Two Component Binder System employed in this Invention.

1. The polymethylol employed as one component of the binder system is of low molecular weight, preferably between about 140 to 220. It is not a resin and is obtained by condensing acetone and formaldehyde in a mole ratio raging from 1.0 mole of acetone: 1.0 to 2.5 mole of formaldehyde at temperatures preferably ranging from about 50° C to about 55° C, the condensation being conducted in the presence of 0.005 to 0.015 preferably in the presence of sodium hydroxide. However, any other alkali metal, hydroxide or alkaline earth hydroxide may be used. Usually, about 40 to 60% by weight solutions of the alkaline condensation catalyst are employed and the condensation is carried out until the pH of the condensation mixture is about 7.

The acidification of the condensation mixture to a pH of 4.0 or below, preferably between 3 to 4 takes place when the temperature has cooled down sufficiently, about 40° C or lower. This can be achieved using mineral or organic acids. Illustrative of the mineral acids are phosphoric, hydrochloric, sulfuric acid, among many other mineral acids. Illustrative of the organic acids are acetic and oxalic acids among others. The concentration of the particular acid used is chosen so that when the aqueous acid is added to the condensation reaction mixture, it will bring the pH preferably to 3 to 4. Phosphoric acid in an 85% by weight solution is commonly used.

When the acidification of the condensation mixture has been completed, the water in the mixture is removed until the solids content is at least 95%, preferably under vacuum distillation.

2. The polyisocyanate, which is the second component of the system, can be any isocyanate containing at least 2 relative isocyanate groups such as hexamethylene diisocyanate and toluene diisocyanate. However, 4,4'-diphenylmethane diisocyanate is preferred because of its low vapor pressure. The polyisocyanate can be used in pure form or diluted in the form of a 40 to 95% solution dissolved in an inert solvent.

B. Mole Ratio of the Two-Component Binder System to Sand. The concentration of binder contained in the sand amounts to 0.25 to 10 parts by weight of polymethylol, based on the weight of sand.

C. Mole ratio of Polymethylol to Polyisocyanate. The ratio of polymethylol to polyisocyanate is based on solids content, in the range of 1:3 to 3:1, preferably 1:1.

D. Additives - One or more additives can be mixed to the formulations of the invention. The formulations are curable by being brought into contact with a tertiary amine, such as trimethyl amine, triethyl amine in the gaseous state. As said before, the curing proceeds so fast that the cure compositions can be taken out of the mold after about 5 minutes. Furthermore, other known curing catalysts may be used in preparing polyurethane, e.g. pyridine compounds, triethylene diamine, or metalorganic compounds. These additives are added directly to the mixture of sand and binder, and optional additives, preferably employing a heavy duty continuous mixer or heavy duty blender. Shortly after being taken off the mold, the cured molds and cores have the bending strength comparable to that of polyurethane-bound molded sand parts after a period of as long as one hour after having been gasified.

In the following Examples, Example 1 describes the preparation of a polymethylol suitable for the manufacture of the compositions of the invention. Examples 2 and 3 illustrate the fabrication of compositions and test rods formed which are gasified and thereafter their bending strength is determined. Examples 4 and 5 demonstrate the superiority of the cured products of Example 1 with the prior art.

EXAMPLE 1

PREPARATION OF A POLYMETHYLOL

In a high quality steel reactor, 87 kg of acetone and 152 kg of a 37 percent aqueous formaldehyde solution are heated to a temperature of from 50° to 55° C. Thereafter, 1.13 kg of a 60 percent aqueous NaOH solution is added while cooling the reactor, so that a temperature of 55° C is not exceeded. When the adding of the NaOH solution is terminated, the batch is heated to a temperature of 75° C for a period of 20 minutes and this temperature is maintained until the pH value has dropped down to 7.0. When the batch has cooled down to 40° C the pH value is adjusted to 3.2 by adding phosphoric acid, and the water is removed by vacuum distillation as completely as possible. The residue is diluted with cyclohexane to yield a 50 percent solution.

The solution of acetone-formaldehyde condensation product in cyclohexane (hereinafter called AFK solution so obtained is employed in the preparation of molding masses as described below.

EXAMPLE 2

5 kg of dry quartz sand, 30 grams of 4,4'-diphenylmethane diisocyanate and 60 grams of AFK solution are admixed to yield molding masses which are densified in a core box according to DIN (German Industrial Standard) No. 52 404 by being rammed thrice and subsequently cured with an atomized triethylene amine catalyst spray. For passing the said atomized catalyst spray through, the mold is provided (deviating from the DIN standard) with a gas feed funnel at the top side and with slot dies at the bottom side.

Immediately after having been released from the molds, the average bending strengths attained amount to 150 N/cm$^2$ and to 250 N/cm$^2$ after a period of 15 minutes storage.

EXAMPLE 3

5 kg of dry quartz sand are well mixed with a mixture of 60 grams of AFK solution and 1 gram of catalyst (50 percent solution of 4-(3-phenyl-propyl)pyridine in an aromatic mixture having a boiling range of from 150° to 180° C). Subsequently, 40 grams of the isocyanate component (75 percent solution of diphenylmethane-4,4-diisocyanate in the same aromatic mixture) are added thereto, mixing all intensively a short time, thereafter forming test rods for determining the bending strength according to DIN Standard. These test rods are taken off the mold after a period of 15 minutes and being broken after another 30 minutes. An average binding strength of 240 N/cm$^2$ is obtained.

COMPARATIVE EXAMPLE 4

To demonstrate the superiority of compositions of this invention compared to Example 1 of German Auslegeschrift No. 2,039,330, 1 mole methyl ethyl ketone and 2.4 moles formaldehyde are submitted to alkaline condensation until a resin having a fusion temperature of about 80° C is obtained. 70 g of a 40% solution of this resin in cyclohexanone are thoroughly mixed with 40 g diisocyanatodiphenylmethane and 4 kg. dry quartz sand, in a paddle-blade-type mixer.

This molding sand mass is used in the same core box as applied in Examples 2 and 3 and densified by 3 ramming according to DIN 52 404 and subsequently cured with atomized triethyl amine spray.

Immediately after curing the test rods have an average bending strength of 0 N/cm$^2$, after 5-minute storage the average bending strength is 1.45 N/cm$^2$, and 15 minutes after curing it amounts to 2.5 N/cm$^2$.

COMPARATIVE EXAMPLE 5

This Example demonstrates the superiority of compositions of this invention compared to Example 2 of German Auslegeschrift No. 2,039,330. The same method as in Comparative Example 4 is used, but 2.6 moles formaldehyde are employed. Condensation is carried out up to a fusion temperature of about 100° C and the condensate is dissolved in a mixture of C$_9$ and C$_{10}$ aromatics. After mixing with sand, the rods are formed according to DIN 52 404 and gasified with triethyl amine-water-acetone aceotrop. The test rods have an average bending strength of 0 N/cm$^2$ directly after they were removed from the molds, and an average bending strength of 1.3 N/cm$^2$ after 5 minutes and of 1.8 N/cm$^2$ after 15 minutes.

A comparison of the bending strengths of the test rods prepared in Examples 2 and 3 with those of Comparative Examples 4 and 5 clearly shows that the compositions prepared according to the claimed invention are curing considerably faster, i.e. may be used for their intended purposes after a much shorter time. Longer storage after removal from the molds is no longer necessary.

As comparative Examples 4 and 5 clearly demonstrate very small changes in the mole ratios of the acetone-formaldehyde and changes of the basicity of the condensation mixture during and after the condensation used to produce the polymethylol component of our invention produce unexpected properties in the bending strength in the molds and cores.

What is claimed is:

1. In the manufacture of quick curing foundry molds and cores by the cold box method employing sand and a two component binder system of a) acetone-formaldehyde condensate and b) a polyisocyanate, said binding system being curable by contact with gaseous amine, the improvement comprising increasing the bending strength of the sand-binder system by conducting the acetone condensation with formaldehyde in a mole ratio of 1.0 mole of acetone to 1.0 to 2.5 moles of formaldehyde, in the presence of 0.005 to 0.015 moles of alkali, acidifying to a pH of 4 and below, followed by the removal of water to produce a low molecular weight non-resinous polymethylol containing a solids content of at least 95%.

2. In the manufacturing process of claim 1 wherein the polymethylol has a molecular weight range of between about 140 to 220.

3. In the manufacturing process of claim 2 wherein the mole ratio of polymethylol to polyisocyanate ranges between about 1:3 to 3:1.

4. In the manufacturing process of claim 3 wherein the polyisocyanate used is 4,4'-diphenylmethane diisocyanate.

* * * * *